United States Patent
Dogiamis et al.

(10) Patent No.: US 10,079,668 B2
(45) Date of Patent: Sep. 18, 2018

(54) WAVEGUIDE COMMUNICATION WITH INCREASED LINK DATA RATE

(71) Applicant: Intel Corporation, Santa Clara, CA (US)

(72) Inventors: Georgios C. Dogiamis, Chandler, AZ (US); Telesphor Kamgaing, Chandler, AZ (US); Emanuel Cohen, Haifa (IL); Sasha N. Oster, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 15/388,204

(22) Filed: Dec. 22, 2016

(65) Prior Publication Data

US 2018/0183561 A1    Jun. 28, 2018

(51) Int. Cl.
  *H04L 5/14*    (2006.01)
  *H04B 1/44*    (2006.01)
  *H04W 72/04*   (2009.01)

(52) U.S. Cl.
  CPC .......... *H04L 5/14* (2013.01); *H04B 1/44* (2013.01); *H04W 72/0453* (2013.01)

(58) Field of Classification Search
  CPC .......... H04L 5/14; H04B 1/44; H04W 72/0453
  See application file for complete search history.

(56) References Cited

U.S. PATENT DOCUMENTS

| | | | |
|---|---|---|---|
| 6,567,648 B1 | 5/2003 | Ahn et al. | |
| 9,825,348 B2 * | 11/2017 | Kikuchi | H01P 5/02 |
| 9,960,849 B1 * | 5/2018 | Dogiamis | H04B 10/2575 |
| 2012/0120862 A1 | 5/2012 | Mihota et al. | |
| 2013/0109317 A1 * | 5/2013 | Kikuchi | H04B 7/24 455/41.2 |
| 2016/0191217 A1 | 6/2016 | Hadani et al. | |
| 2016/0322691 A1 | 11/2016 | Bennett et al. | |

FOREIGN PATENT DOCUMENTS

KR    10-1378650 B1    3/2014

OTHER PUBLICATIONS

International Search Report and Written Opinion dated Mar. 29, 2018 for International Application No. PCT/US2017/063058, 17 pages.

* cited by examiner

*Primary Examiner* — Kashif Siddiqui
(74) *Attorney, Agent, or Firm* — Schwabe, Williamson & Wyatt, P.C.

(57) ABSTRACT

Embodiments of the present disclosure may relate to a transceiver to transmit and receive concurrently radio frequency (RF) signals via a dielectric waveguide. In embodiments, the transceiver may include a transmitter to transmit to a paired transceiver a channelized radio frequency (RF) transmit signal via the dielectric waveguide. A receiver may receive from the paired transceiver a channelized RF receive signal via the dielectric waveguide. In embodiments, the channelized RF receive signal may include an echo of the channelized RF transmit signal. The transceiver may further include an echo suppression circuit to suppress from the channelized RF receive signal the echo of the channelized RF transmit signal. In some embodiments, the channelized RF transmit signal and the channelized RF receive signal may be within a frequency range of approximately 30 gigahertz (GHz) to approximately 1 terahertz (THz), and the transceiver may provide full-duplex millimeter-wave communication.

24 Claims, 8 Drawing Sheets

WAVEGUIDE COMMUNICATION WITH INCREASED LINK DATA RATE

FIELD

Embodiments of the present disclosure generally relate to the field of communication over dielectric waveguides and, more particularly, to waveguide communication with increased link data rate.

BACKGROUND

As increasing numbers of devices become interconnected and users consume more data, the demand on servers to provide that data may continue to grow. These demands may include, for example, increased data rates, switching architectures with longer interconnects, reduced cost, and power competitive solutions.

For medium range transmission in servers and high performance computers, dielectric waveguides operating millimeter-scale electromagnetic wavelengths, sometimes referred to as a millimeter-wave (mm-wave) frequency range, may provide a performance and/or cost advantage with respect to optical and/or electrical fabrics. As used herein, "medium range" may refer to transmission ranges of approximately 1 to approximately 5 meters (m). The desired data rate at a mm-wave frequency range may be achieved by taking advantage of available frequency bandwidth. For example, a radio or transceiver operating over a 40 Gigahertz (GHz) bandwidth from 100 GHz to 140 GHz may deliver data rates of approximately 40 Gigabits per second (Gbps) with a quadrature phase shift keying (QPSK) modulation scheme. The same radio may deliver up to 80 Gbps over the same frequency range if a quadrature amplitude modulation 16 (QAM16) modulation scheme is used.

In some radio-over-waveguide applications, point-to-point communication between two connected devices may be directed in both directions. Such communications may operate as emulated full-duplex systems over a half-duplex channel and employ time-division multiplexing (TDM) or frequency-division multiplexing (FDM), for example.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
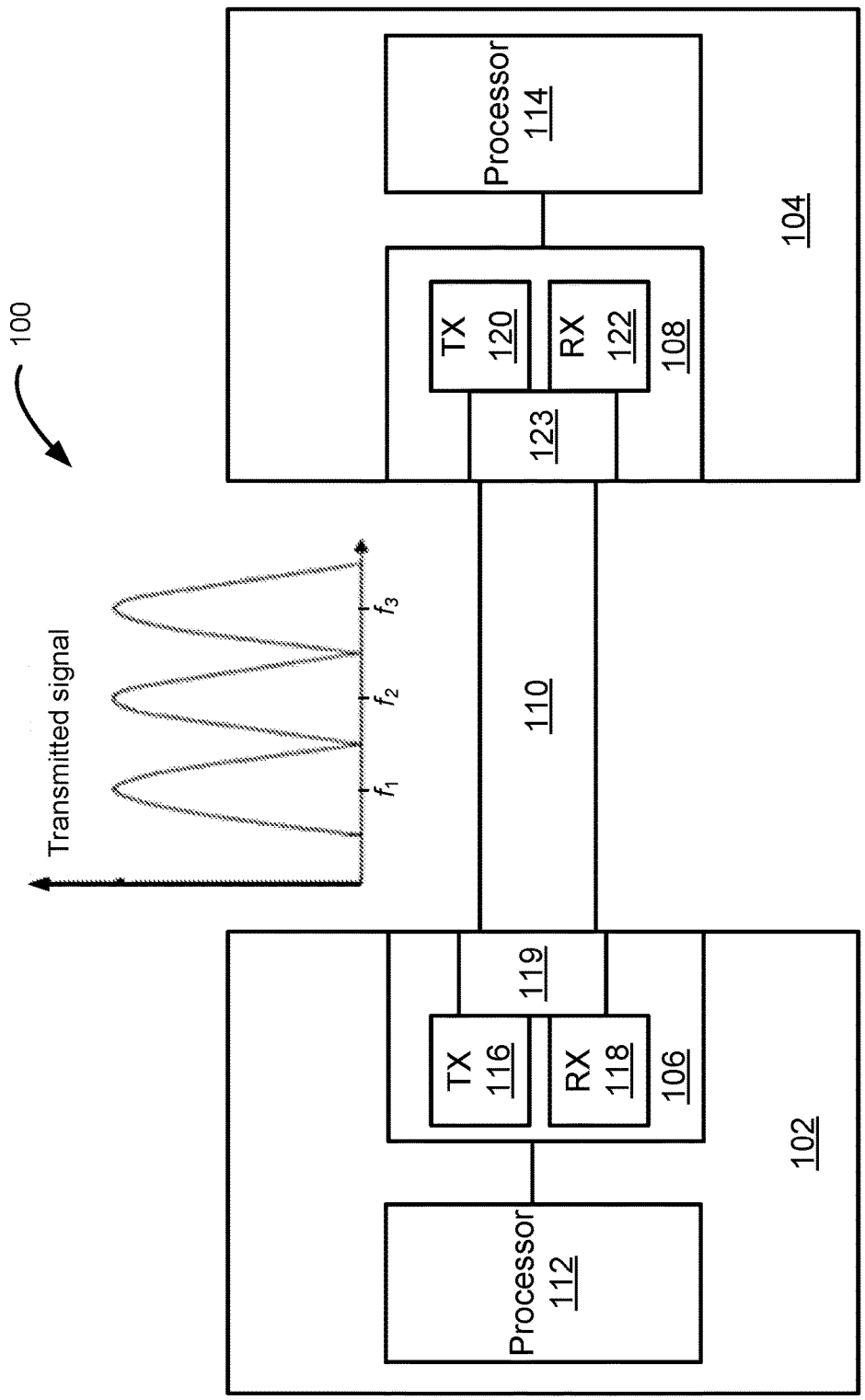
FIG. 1 depicts a block diagram of a system with transceivers to transmit and receive channelized signals over a dielectric waveguide, in accordance with various embodiments.

Embodiments of the present disclosure may relate to a transceiver to transmit and receive concurrently radio frequency (RF) signals via a dielectric waveguide. In embodiments, the transceiver may include a transmitter to transmit to a paired transceiver a channelized radio frequency (RF) transmit signal via the dielectric waveguide. A receiver may receive from the paired transceiver a channelized RF receive signal via the dielectric waveguide. A circulator may be coupled between the transmitter, the receiver, and the dielectric waveguide to deliver the channelized RF transmit signal from the transmitter to the dielectric waveguide and to concurrently deliver the channelized RF receive signal from the dielectric waveguide to the receiver. In embodiments, the channelized RF receive signal delivered from the circulator may include an echo of the channelized RF transmit signal from the transceiver. The transceiver may further include an echo suppression circuit to suppress from the channelized RF receive signal the echo of the channelized RF transmit signal. In some embodiments, the channelized RF transmit signal and the channelized RF receive signal each has a frequency range from a lower frequency greater than or equal to approximately 30 gigahertz (GHz) to an upper frequency less than approximately 1 terahertz (THz), and the transceiver may provide full-duplex millimeter-wave communication.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 depicts a system 100 having a first electronic device 102 and a second electronic device 104 that may include a first transceiver 106 and a second transceiver 108, respectively, to transmit and receive channelized signals over a dielectric waveguide 110, in accordance with various embodiments. In some embodiments, the dielectric waveguide 110 may be referred to as a "channel". However, it should be understood that a physical waveguide channel is different than the frequency channels used for channelized signal transmission over the dielectric waveguide 110. In some embodiments, the first electronic device 102 may include a first processor 112 coupled with the first transceiver 106 and the second electronic device 104 may include a second processor 114 coupled with the second transceiver 108. In various embodiments, the first electronic device 102 and/or the second electronic device 104 may be a computing device such as a blade server in a data center, a networking device such as a switch or router, or some other electronic device that transmits and/or receives data.

In some embodiments, the first transceiver 106 may include a first transmitter 116 and a first receiver 118. In various embodiments, the first transmitter 116 may be configured to receive one or more data signals from a data source such as the first processor 112. In some embodiments, the first transmitter 116 may generate a channelized signal having two or more frequency channels that may be in distinct non-overlapping frequency bands and may modulate a signal to be transmitted in each channel based at least in part on the received one or more data signals. As shown, a transmitted signal may include three frequency channels, with the first channel having a first center frequency, $f_1$, the second channel having a second center frequency, $f_2$, and the third channel having a third center frequency, $f_3$. Although three frequency channels are shown, a different number of channels may be used in other embodiments. In various embodiments, the first receiver 118 may be configured to receive a channelized signal over the dielectric waveguide 110 and demodulate the channelized signal to recover data that may then be provided to another component such as the processor 112.

In some embodiments, the first transceiver 106 may include a first waveguide interface 119 coupled with the first transmitter 116 and the first receiver 118. In various embodiments, the first waveguide interface 119 may be configured to allow the first transmitter 116 and the first receiver 118 to simultaneously or concurrently transmit and receive over the waveguide 110. Similarly, the second transceiver 108 may include a second transmitter 120 and a second receiver 122 that may operate in similar fashion to that described with respect to the first transmitter 116 and the first receiver 118, respectively. In various embodiments, the first transceiver 106 may communicate with the second transceiver 108 over a single dielectric waveguide 110 and may be able to simultaneously receive and transmit over the dielectric waveguide 110 on multiple frequency channels.

In some embodiments, the second transceiver 108 may include a second waveguide interface 123 coupled with the second transmitter 120 and the second receiver 122. In various embodiments, the second waveguide interface 123 may be configured to allow the second transmitter 120 and the second receiver 122 to simultaneously transmit and receive over the waveguide 110. In various embodiments, the first transceiver 106 and the second transceiver 108 may communicate over the dielectric waveguide 110 in a radio frequency (RF) frequency range that may be, for example, between approximately 30 GHz and approximately 300 GHz. In some embodiments, this RF frequency range may be described as a millimeter (mm)-wave frequency range. In various embodiments, the RF frequency range used for communication over the dielectric waveguide may extend upwards beyond 300 GHz into the sub-terahertz (THz) range to below approximately 1 THz.

The dielectric waveguide 110 may include a plurality of different dielectric layers with different refractive indices. For example, the dielectric waveguide 110 may be composed of three different dielectric layers. The refractive indices of the layers of the dielectric waveguide 110 may be selected such that the RF signal transmitted through the dielectric waveguide 110 may generally reflect within, and propagate through, the dielectric waveguide 110 without incurring significant signal loss. In some embodiments, the dielectric waveguide 110 may be a metal coated dielectric waveguide.

In embodiments, the example system 100 may be an element of a server. For example, the first electronic device 102 may be an element of one rack of a server, and the second electronic device 104 may be an element of another rack of the server. In other embodiments, the first transceiver 106 may be an element of one server, and the second transceiver 108 may be an element of another server. These are intended only as example configurations, and in other configurations the first transceiver 106 and/or the second transceiver 108 may be elements of some other type of server, computing device, mobile device, laptop, desktop, data center, or some other electronic device. In some embodiments, the dielectric waveguide 110 may have a length of between approximately 1 meter (m) and 5 m, but may have a different length in other embodiments. In various embodiments, the first processor 112 and the first transceiver 106 may be included on a common substrate of the first electronic device 102 and/or the second processor 114 and the second transceiver 108 may be included on a common substrate of the second electronic device 104.

Figure 2:
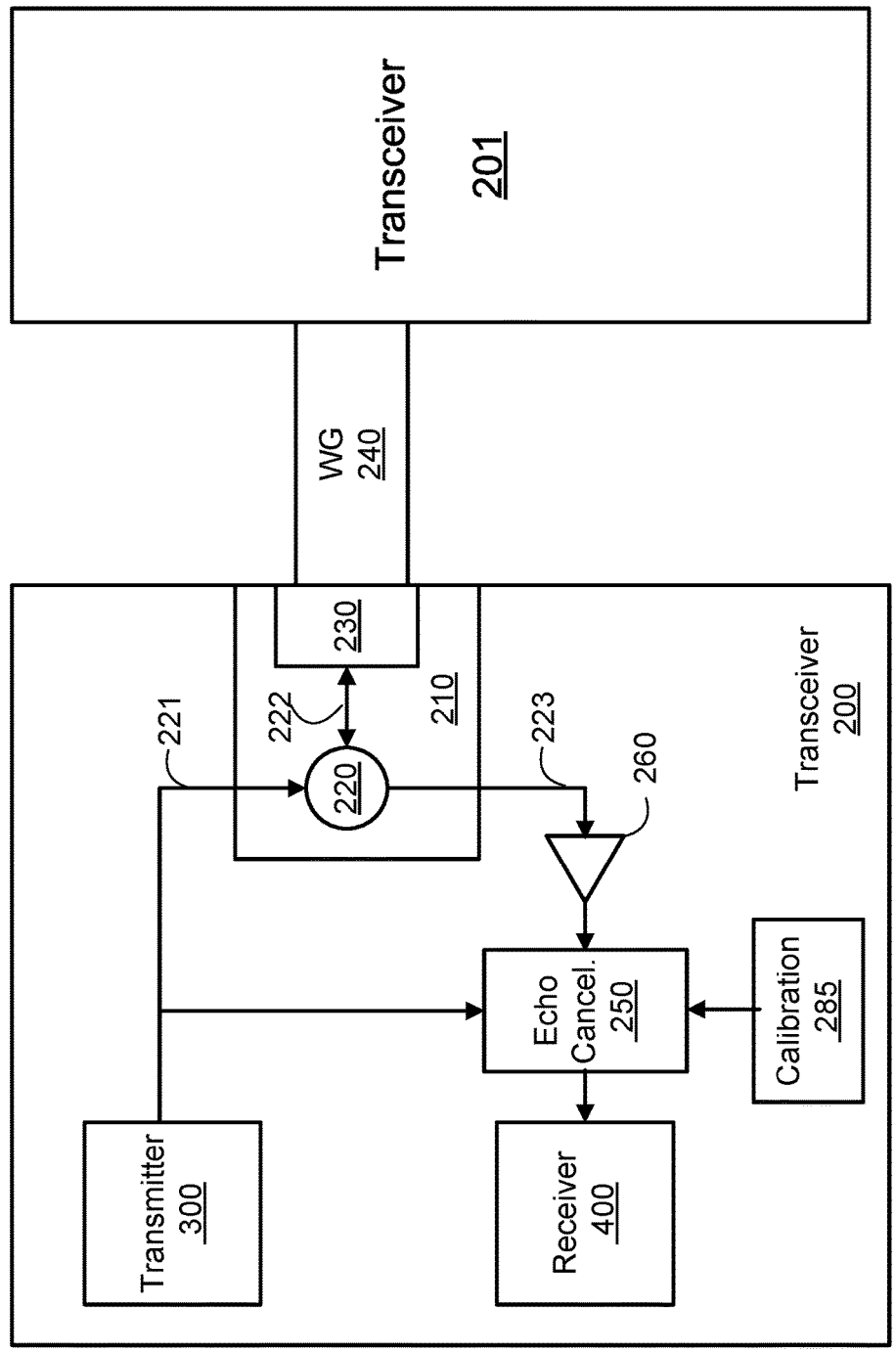
FIG. 2 depicts a block diagram of a transceiver to transmit and receive channelized signals over a dielectric waveguide, in accordance with various embodiments.

FIG. 2 is a block diagram of a transceiver 200 that, according to some embodiments, may include a transmitter 300 to modulate and transmit data signal inputs as a plurality of channelized transmit signals and a receiver 400 to receive and demodulate a plurality of channelized receive signals. In some embodiments, the transceiver 200 may be an implementation of the first transceiver 106 and/or the second transceiver 108 described with respect to FIG. 1, the transmitter 300 may be an implementation of the first transmitter 116 and/or the second transmitter 120 described with respect to FIG. 1, and the receiver 400 may be an implementation of the first receiver 118 and/or the second receiver 122 described with respect to FIG. 1. Embodiments of the transmitter 300 and the receiver 400 are described in greater detail below with reference to FIGS. 3 and 4, respectively.

In some embodiments, transceiver 200 may further include a waveguide interface 210, which may be an implementation of the first waveguide interface 119 and/or the second waveguide interface 123 described with respect to FIG. 1. Waveguide interface 210 may include a circulator 220 and a dielectric waveguide connector 230 for connecting transceiver 200 with a dielectric waveguide 240. Circulator 220 may include a port 221 coupled to transmitter 300, a port 222 coupled to waveguide 240 via connector 230, and a port 223 to communicate with receiver 400. Transmitter 300 may deliver a transmit signal to waveguide 240 via circulator 220 for transmission to a paired transceiver 201. Receiver 400 may receive a receive signal from waveguide 240 via circulator 220, as a transmission from the paired transceiver 201. In embodiments, paired transceiver 201 may be an implementation of transceiver 200.

Waveguide interface 210 may allow transmitter 300 and receiver 400 to, respectively, transmit and receive over waveguide 240 simultaneously and/or concurrently. In embodiments, circulator 210 may be configured and/or operate as a hard-wired router, in that the transmit signal from the transmitter 300 may be delivered to the waveguide 240, and the receive signal from the waveguide 240 may be directed toward the receiver 400 simultaneously. As a result, transceiver 200 may operate in full-duplex, which may provide increased (e.g., doubled) data rates or bandwidth over communication systems that may employ emulated full-duplex communication over a half-duplex channel using time-division multiplexing (TDM) or frequency-division multiplexing (FDM). In addition to increased data rates or bandwidth, full-duplex operation of transceiver 200 may provide improved space efficiency (sometimes referred to as bandwidth density) and decreased cost.

An aspect of such full-duplex operation of transceiver 200, however, may be that the receive signal directed from circulator 220 toward receiver 400 may include noise and/or distortion, which may be related to the transmit signal from transmitter 300. In some embodiments, the noise or distortion may include a concurrent echo of a transmit signal that may pass from transmitter 300 and through circulator 210 concurrently or simultaneously as the receive signal passes circulator 220 toward receiver 400. The concurrent echo may be imparted on or distort the receive signal at circulator 220. Such noise or distortion of the receive signal may arise in some embodiments because isolation between ports 221 and 223 may be non-ideal (e.g., non-infinite) and/or the transmit signal from transmitter 300 at port 221 may have a power greater than a power of the receive signal at port 223 received from waveguide 220, resulting in the concurrent echo being imparted on the receive signal.

In addition, noise or distortion imparted on the receive signal may include a reflected echo of the transmit signal transmitted from transmitter 300 at a previous time along waveguide 220 to paired transceiver 201, and reflected back to transceiver 200 along waveguide 220 from the paired transceiver 201 and received by receiver 400 with the receive signal. The reflected echo may include a delay corresponding to propagation of the transmit signal from transmitter 300 at the previous time, along the waveguide 240, to the paired transceiver 201, and back as a reflected echo. The reflected echo may also include amplitude attenuation related to propagating along waveguide 220 two times. For example, if the waveguide 220 has a 10 dB loss between transceiver 200 and the paired transceiver 201, the reflected echo may have an amplitude attenuation of 20 dB based on traveling waveguide 220 from transceiver 200, to paired transceiver 201, and back. In contrast, the receive signal received by transceiver 200 from paired transceiver 201 may have an amplitude attenuation of 10 dB based on a single transmission from along waveguide 240 from paired transceiver 201. As a result, the receive signal may be of a greater amplitude than the reflected echo.

In addition, the reflected echo may include chromatic dispersion in which the phase velocity of an electromagnetic wave in a dielectric waveguide may depend on its frequency and may result in signals of different frequencies propagating at different speeds through a medium such as the dielectric waveguide 220. For example, chromatic dispersion may cause frequency channels at a higher frequency to experience less delay than signals at a lower frequency.

In embodiments, transceiver 200 and/or receiver 400 may include an echo suppression circuit 250, which may also be referred to as an echo cancellation circuit, through which the receive signal received by circulator 220 from waveguide 240 may be directed to receiver 400. Also in some embodiments, transceiver 200 and/or receiver 400 may include a preamplifier filter 260 that may condition the receive signal, as described below. Echo suppression circuit 250 may provide suppression and/or cancellation of noise and or distortion on the receive signal. In embodiments, echo suppression circuit 250 may suppress or cancel concurrent echo and/or reflected echo that may distort the receive signal. For example, echo suppression circuit 250 may subtract from the receive signal a representation of the transmit signal from transmitter 300 corresponding to the concurrent echo and/or the reflected echo. The representation of the transmit signal corresponding to the concurrent echo and/or the reflected echo may include delay and appropriate filtering will be determined by the type and length of the waveguide. It may therefore be desirable for this delay and filter to be adjustable or programmable to accommodate different channels.

With regard to concurrent echo suppression, echo suppression circuit 250 may include an input 270 to receive from transmitter 300 the transmit signal that corresponds to the concurrent echo. In embodiments, echo suppression circuit 250 may generate a concurrent echo suppression signal that corresponds to an attenuated version of the transmit signal, and may include a time delay corresponding to the time for the concurrent echo to pass through circulator 220 and preamplifier filter 260. Echo suppression circuit 250 may suppress and/or cancel the concurrent echo by subtracting the concurrent echo suppression signal from the receive signal.

In some embodiments, for example, subtracting the concurrent echo suppression signal from the receive signal may include summing an inverse of the concurrent echo suppression signal with the receive signal. In some other embodiments, isolation response of circulator 220 may not be uniform in amplitude or phase across an entire frequency band. In such embodiments, preamplifier filter 260 may be included with an inverse response to offset nonuniform isolation response of circulator 220 in amplitude or phase. Chromatic dispersion of the concurrent echo may be negligible.

With regard to reflected echo suppression, echo suppression circuit 250 may generate a reflected echo suppression signal and may suppress and/or cancel the reflected echo by subtracting the reflected echo suppression signal from the receive signal. The reflected echo suppression signal may be generated with accommodation for chromatic dispersion of the reflected echo, with respect to its original transmit signal, and the time delay for the reflected echo to travel the length of waveguide 240 and back.

Transceiver 200 and/or receiver 400 may include a waveguide channel calibration circuit 285 that may communicate and cooperate with echo suppression circuit 250 to generate the reflected echo suppression signal with accommodation for chromatic dispersion of the reflected echo and the time delay for the reflected echo to travel the length of waveguide 240 and back. In embodiments, calibration circuit 285 may be adjustable or programmable to adapt or calibrate the reflected echo suppression signal according known characteristics of waveguide 240 including its chromatic dispersion and/or its length, for example, or to accommodate different channels. The reflected echo suppression signal may also be based on a transmit signal received from transmitter 300 at input 270, but with a time offset to accommodate the time delay for the reflected echo to travel the length of waveguide 240 and back, and with accommodation for chromatic dispersion provided by calibration circuit 285. In embodiments, echo suppression circuit 250 may generate the reflected echo suppression signal with a decreased amplitude to accommodate attenuation of the reflected echo due to traveling the length of waveguide 240 twice.

Figure 3:
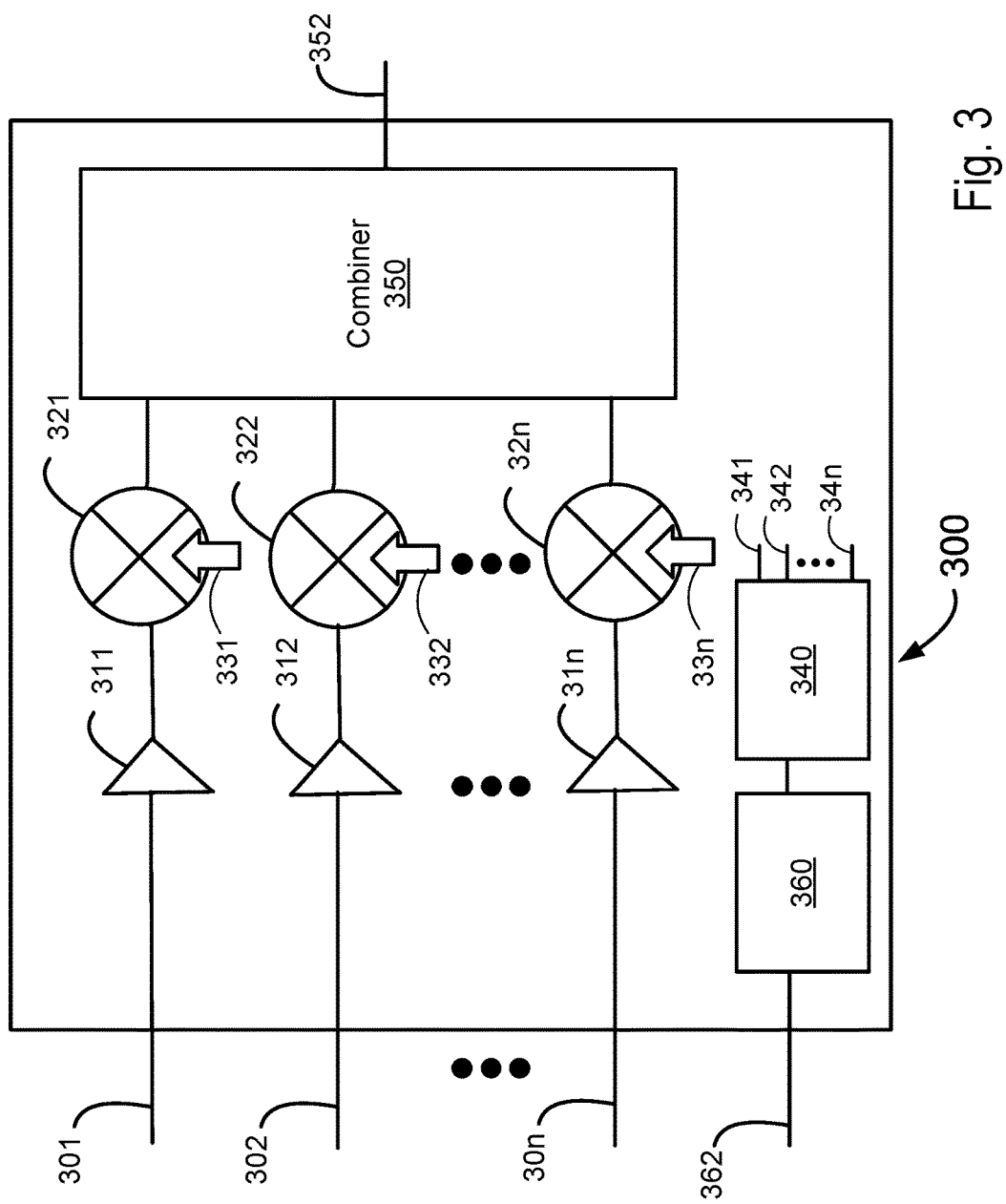
FIG. 3 is a block diagram of a transmitter to transmit channelized signals over a dielectric waveguide, in accordance with various embodiments.

FIG. 3 is a block diagram of a transmitter 300 to modulate data signal inputs onto a plurality of channelized signals, in accordance with various embodiments. In some embodiments, the transmitter 300 may be an implementation of the first transmitter 116 and/or the second transmitter 120 described with respect to FIG. 1. In various embodiments, the transmitter 300 may include n data signal inputs such as inputs 301, 302, 30n, etc. It should be understood that n inputs represents a general number of inputs, where various embodiments may have differing numbers of data signal inputs. In some embodiments, the signals may be received from an electronic device to which the transmitter 300 is physically, electronically, and/or communicatively coupled (e.g., first processor 112 or second processor 114). In various embodiments, the transmitter 300 may share the same housing as the electronic device, or be separate from the electronic device but communicatively coupled to the electronic device by the data signal inputs 301/302/30n.

In various embodiments, the transmitter 300 may include a plurality of components, such as amplifiers 311, 312, 31n, etc., each of which may receive one of the data signal inputs 301/302/30n to generate an amplified signal. In some embodiments, the transmitter 300 may include a plurality of mixers 321, 322, 32n, each of which may have a local oscillator signal input 331, 332, 33n, respectively to receive a signal from a local oscillator synthesizer. In various embodiments, the transmitter 300 may include a local oscillator synthesizer 340 to generate a plurality of local oscillator signals 341, 342, 34n, etc. that may be used as inputs to the local oscillator signal inputs 331, 332, 33n, respectively. In some embodiments, the mixers 321/322/32n may upconvert the incoming amplified data signals based at least in part on the local oscillator signals 341/342/34n. In various embodiments, the mixers 321/322/32n may include additional inputs (not shown for clarity) and/or may also be modulators that may modulate the upconverted RF signal with a modulation scheme such as binary phase-shift keying (BPSK), quadrature phase-shift keying (QPSK), 8 phase-shift keying (8-PSK), a pulse amplitude modulation (PAM) scheme (e.g., PAM4), a quadrature amplitude modulation (QAM) scheme (e.g., QAM16), or any other suitable modulation scheme.

In some embodiments, the transmitter 300 may include a combiner 350 that may receive the upconverted, modulated RF signals from the mixers 321/322/32n as inputs and combine the RF signals to produce a channelized output RF signal at an output 352 that may be coupled with the waveguide 110 for transmission of the channelized RF signal to another device. In various embodiments, some other component such as a multiplexer may be used in addition to, or in place of, the combiner 350. In some embodiments, the transmitter 300 may use a frequency division multiple access (FDMA) approach.

In various embodiments, the LO oscillator signals 341/342/34n output by the LO synthesizer 340 may be fixed frequencies used by the mixers 321/322/32n to upconvert the incoming signals from the amplifiers 311/312/31n to have the center frequencies $f_1$, $f_2$, $f_3$ shown in FIG. 1 or the center frequencies $f_1$, $f_2$, $f_N$ shown in FIG. 2. In some embodiments, the LO synthesizer 340 may be programmable such that the LO oscillator signals 341/342/34n may be changed in frequency and/or number. In embodiments, the LO synthesizer 340 may be programmable based at least in part on switching one or more capacitor banks on and/or off in response to one or more control signals.

In various embodiments, the transmitter 300 may include logic circuitry 360 coupled with the LO synthesizer 340 to direct the LO synthesizer 340 to generate the LO oscillator signals 341/342/34n based at least in part on a signal received at a LO control input 362. In some embodiments, the LO control input 362 may be a serial peripheral interface (SPI) bus coupled with a microcontroller (not shown for clarity) that may be included in the first electronic device 102 or the second electronic device 104. In other embodiments, the logic circuitry 360 may receive a signal at the LO control input 362 from the first processor 112 or the second processor 114. In some embodiments, the LO control input 362 may not be present and the logic circuitry 360 may direct the LO synthesizer 340 based on circuitry and/or modules within the logic circuitry 360 without using control signals from an external input such as the LO control input 362. In various embodiments, the logic circuitry 360 may be or include a controller to direct the LO synthesizer 340 to generate a number of frequencies based at least in part on a total group delay over an available frequency bandwidth. In some embodiments, the number of channels for modulated RF signal transmission may be equal to the number of frequencies generated by the LO synthesizer 340.

It should be understood that the transmitter 300 is intended as an example and other configurations may be possible. For example, additional components such as filters, processors, etc. may be present in transmitter 300. In some embodiments, there may be more or fewer amplifiers than shown in FIG. 3. For example, in some embodiments a single amplifier may be shared among multiple signal lines, or a single signal line may be coupled with a plurality of amplifiers. In some embodiments a signal line may not include an amplifier. As used herein, a "signal line" with respect to the transmitter 300 may refer to the above-described transmission path of data received on an input such as input 301, 302, 30n, etc. Similarly, there may be more or fewer mixers than shown in FIG. 3. In some embodiments, the arrangement of the elements may be different than shown, for example, one or more mixers 321/322/32n may precede an amplifier 311/312/31n in a signal line. In embodiments, one or more of the described amplification, mixing, modulation, upconversion, combining, etc. may be performed by one or more circuitry, modules, logic, firmware, software, and/or hardware.

In embodiments, the frequency channelization may be selected or configured based on a characteristic of the dielectric waveguide 110. For example, the number and/or center frequencies of the LO signals generated by the LO synthesizer 340 may be preconfigured based on a known channel response or channel characteristic of the dielectric waveguide 110 such as the total dispersion over an available bandwidth. In other embodiments, the transmitter 300 may be configured to dynamically and/or periodically test the dielectric waveguide 110 to identify a characteristic of the dielectric waveguide 110 on which to base the frequency channelization parameters.

In various embodiments, the transmitter 300 may also include additional components such as one or more dispersion compensators, equalization circuits, pre-distortion circuits, digital trimming circuits, pulse shaping circuits, and/or other types of signal processing circuits not shown for clarity. Although some components, such as the logic circuitry 360 may be referred to as circuitry, it should be understood that the components of the transmitter 300 may be performed by one or more modules, logic, firmware, software, and/or hardware.

Figure 4:
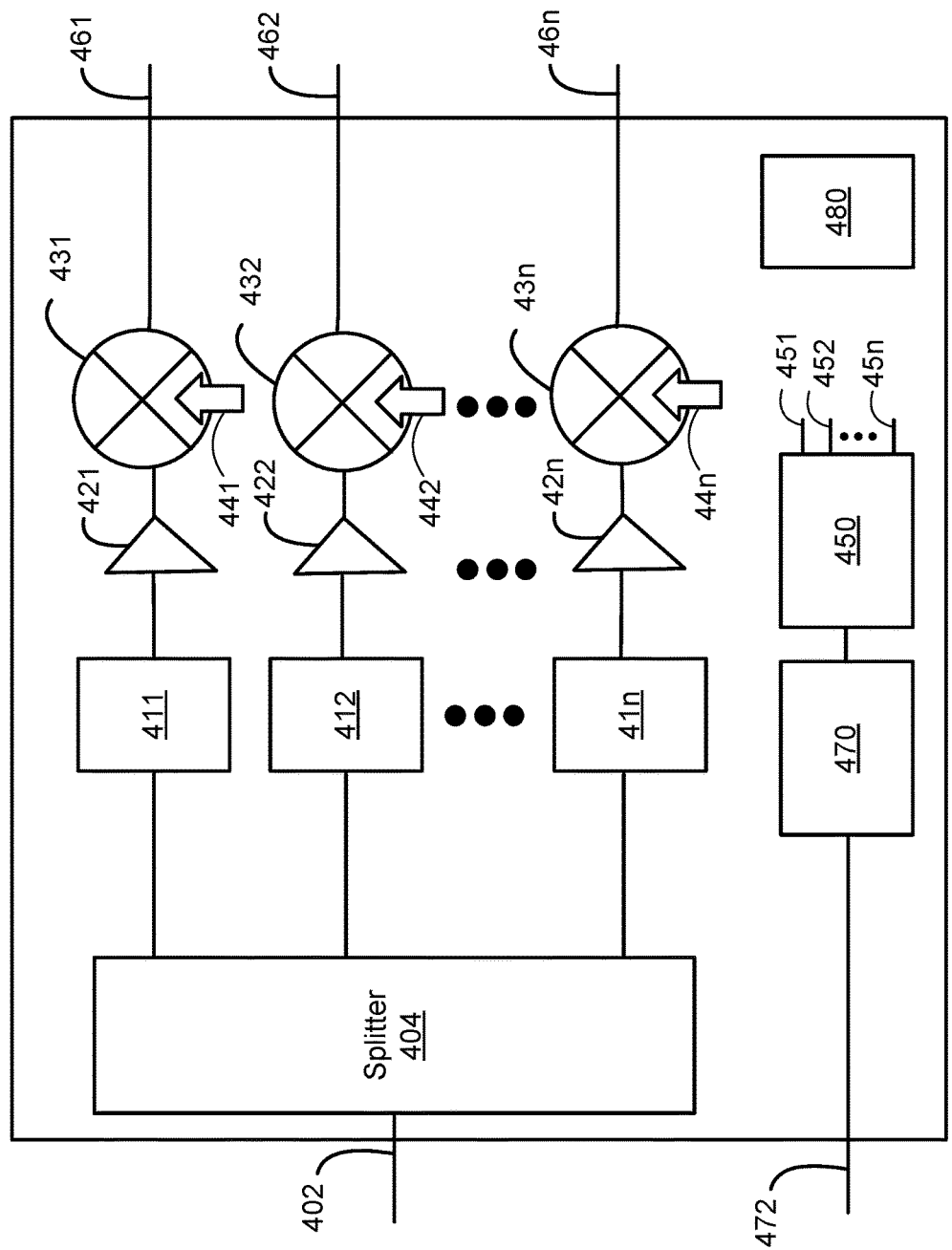
FIG. 4 is a block diagram of a receiver to receive channelized signals from a dielectric waveguide, in accordance with various embodiments.

FIG. 4 depicts a block diagram of a receiver 400, in accordance with various embodiments. In some embodiments, the receiver 400 may be an implementation of the first receiver 118 and/or the second receiver 122 described with respect to FIG. 1. In various embodiments, the receiver 400 may include an input 402 to be coupled with the dielectric waveguide 110. In some embodiments, the input 402 may receive, from the dielectric waveguide 110, a channelized, modulated, RF signal such as may be transmitted by the transmitter 300. In various embodiments, the receiver 400 may include a splitter 404 coupled with the input 402. In some embodiments, the splitter 404 may be a demultiplexer. In various embodiments, the splitter 404 may be configured to split a channelized RF signal from the input 402 into a plurality of RF signals on n different signal lines. In some embodiments, the number of signal lines generated by the splitter 404 may be the same as the number of signal lines propagating through the transmitter 300. Similarly to the use of the term with respect to the transmitter 300, the term "signal line" may refer to the transmission path of data through the receiver 400. More specifically, receiver 400 is shown as having n different signal lines.

In some embodiments, the receiver 400 may include a plurality of filters 411, 412, 41n, etc., each of which may receive one of the signal lines from the splitter 404 as an input. In some embodiments, the filters 411/412/41n may be band pass filters, each of which may be configured to pass RF signals in a predetermined frequency range. In other embodiments, one or more of the filters 411/412/41n may be programmable filters that may have a configurable frequency pass band or range that may be altered based at least in part on a filter control signal at a filter control signal input (not shown for clarity). In various embodiments, the receiver 400 may include other components, such as amplifiers 421, 422, 42n to amplify signals from the filters 411/412/41n. In some embodiments, the receiver may include a plurality of demodulators 431, 432, 43n, etc. to demodulate and downconvert signals from the amplifiers 421/422/42n based at least in part on a signal received at a local oscillator input 441/442/44n, respectively. In various embodiments, one or more of the demodulators 431/432/43n may include or be a mixer.

In some embodiments, the receiver 400 may include a local oscillator synthesizer 450 to generate a plurality of local oscillator signals 451, 452, 45n, etc. that may be used as inputs to the local oscillator inputs 441, 442, 44n, respectively. In some embodiments, the demodulators 431/432/43n may downconvert the amplified signals based at least in part on the local oscillator signals 451/452/45n and demodulate the signals to generate output signals 461, 462, 46n, etc. that may be provided to another component such as the first processor 112 or the second processor 114. In various embodiments, the demodulators 431/432/43n may include additional inputs and/or outputs (not shown for clarity). In various embodiments, the LO oscillator signals 451/452/45n output by the LO synthesizer 450 may be fixed frequencies used by the demodulators 431/432/43n to downconvert the incoming signals from the amplifiers 421/422/42n and/or the filters 411/412/41n. In some embodiments, the LO synthesizer 450 may be programmable such that the LO oscillator signals 451/452/45n may be changed in frequency and/or number. In embodiments, the LO synthesizer 450 and/or the filters 411/412/41n may be programmable based at least in part on switching one or more capacitor banks on and/or off in response to one or more control signals.

In various embodiments, the receiver 400 may include logic circuitry 470 coupled with the LO synthesizer 450 to direct the LO synthesizer 450 to generate the LO oscillator signals 451/452/45n based at least in part on a signal received at a LO control input 472. In some embodiments, the filters 411/412/41n may be programmable, with filtering characteristics such as a pass band based at least in part on a filter control signal generated by the logic circuitry 470. In various embodiments, the logic circuitry 470 may provide control signals to both the filters 411/412/41n and the LO synthesizer 450. In some embodiments, the LO control input 472 may be a SPI bus coupled with a microcontroller (not shown for clarity) that may be included in the first electronic device 102 or the second electronic device 104. In other embodiments, the logic circuitry 470 may receive a signal at the LO control input 472 from the first processor 112 or the second processor 114. In some embodiments, the LO control input 472 may not be present and the logic circuitry 470 may direct the LO synthesizer based on circuitry and/or modules within the logic circuitry 470 without using control signals from an external input such as the LO control input 472. In various embodiments, the logic circuitry 470 may be or include a controller coupled with the filters 411/412/41n to direct respective ones of the filters 411/412/41n to allow RF signals in a channel frequency range having a lower frequency and an upper frequency specified by the controller to pass through the filters 411/412/41*n*.

In some embodiments, the logic circuitry 470 may not be present and/or the LO synthesizer 450 and/or the filters 411/412/41*n* may receive control signals from logic circuitry located outside of the receiver 400. In some embodiments, the logic circuitry 470 and the logic circuitry 360 may be in a common location and/or may receive control signals from a common component. In embodiments, a single LO synthesizer may be used for both the LO synthesizer 340 and the LO synthesizer 450.

It should be understood that the receiver 400 is intended as an example and other configurations may be possible. For example, additional components such as filters, processors, etc. may be present in receiver 400. In some embodiments, there may be more or fewer filters or amplifiers than shown in FIG. 4. For example, in some embodiments a single amplifier may be shared among multiple signal lines, or a single signal line may be coupled with a plurality of amplifiers. In some embodiments a signal line may not include an amplifier. As used herein with respect to the receiver 400, a "signal line" may refer to the above-described reception path of a signal from the splitter 404 that is converted to output data signals at the outputs 461/462/46*n*. Similarly, there may be more or fewer demodulators than shown in FIG. 4. In some embodiments, the arrangement of the elements may be different than shown, for example, one or more demodulators 431/432/43*n* may precede an amplifier 431/432/43*n* in a signal line. In some embodiments, the receiver 400 may include a clock and data recovery (CDR) circuit 480 and may be configured to use the CDR circuit 480 in conjunction with the demodulators 431/432/43*n* to generate the output data signals at the outputs 461/462/46*n*. In embodiments, one or more of the described filtering, amplifying, demodulation, downconversion, etc. may be performed by one or more circuitry, modules, logic, firmware, software, and/or hardware.

In embodiments, the filter characteristics and/or the LO signals may be selected or configured based on a characteristic of the dielectric waveguide 110. In some embodiments, the filter characteristics and/or the LO signals may be selected or configured based at least in part on a signal from a transmitter such as the transmitter 300 indicating a channelization scheme used by the transmitter. In some embodiments, a transmission protocol may include a header indicating channelization scheme parameters. In various embodiments, the logic circuitry 470 may adjust one or more of the LO synthesizer 450 or one or more of the filters 411/412/41*n* based at least in part on the channelization scheme parameters received in the header from a transmitter such as the transmitter 300.

In various embodiments, the receiver 400 may also include additional components such as one or more dispersion compensators, equalization circuits, digital trimming circuits, pulse shaping circuits, and/or other types of signal processing circuits not shown for clarity. Although some components, such as the logic circuitry 470 may be referred to as circuitry, it should be understood that the components of the receiver 400 may be performed by one or more modules, logic, firmware, software, and/or hardware.

In various embodiments, the above described system 100, transmitter 300, and/or receiver 400 may present advantages to systems that use dielectric waveguides 110 in the 1 m to 5 m range to convey signals in the mm-wave range and/or sub-THz range. For example, the above-described architecture may help to achieve higher data rates than systems that do not channelize transmission signals to compensate for chromatic dispersion. Additionally, the use of a dielectric waveguide and/or a transceiver implementation that may use complementary metal oxide semiconductor (CMOS) technology for transmission of signals in the mm-wave and/or sub-THz range may present a cost advantage in comparison to optical interconnects and transceivers. In some embodiments, channelizing signals may also allow dispersion compensators with lower power requirements to be used than would be possible with a wideband transmission approach.

Figure 5:
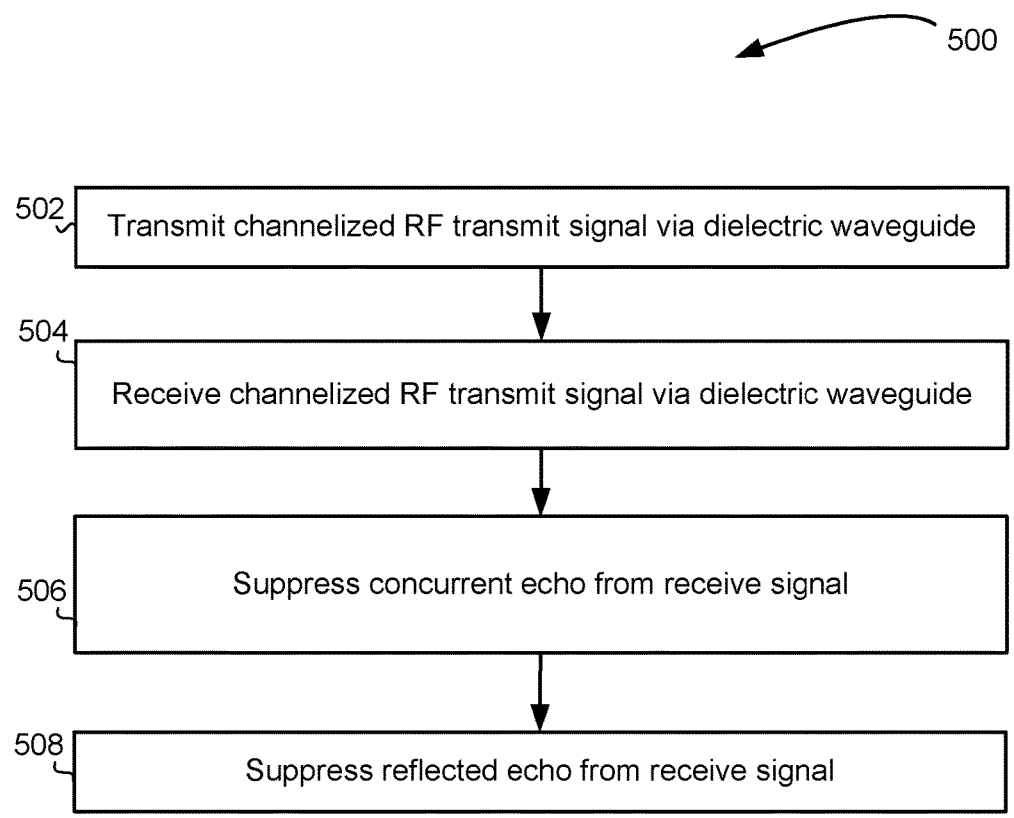
FIG. 5 is a flow diagram of a technique of radio frequency communication over a dielectric waveguide with echo suppression, in accordance with various embodiments.

FIG. 5 is a flow diagram of a technique 500 of radio frequency communication over a dielectric waveguide with echo suppression. Technique 500 may provide full-duplex communication in a mm-wave frequency range, in accordance with various embodiments. In embodiments, some or all of the technique 500 may be practiced by components shown and/or described with respect to the first electronic device 102 or the second electronic device 104 of FIG. 1; the transceiver of FIG. 2; the transmitter 300 of FIG. 3; the receiver 400 of FIG. 4; and/or the computing device 700 of FIG. 7.

In various embodiments, the technique 500 may include at a block 502 transmitting a channelized radio frequency (RF) transmit signal via a dielectric waveguide to a paired transceiver. In embodiments, the channelized RF transmit signal may include a plurality of modulated RF transmit signals, and each may be in a channel having a frequency band that does not overlap with the frequency band of another of the modulated RF transmit signals.

A block 504 may include receiving from the paired transceiver a channelized RF receive signal via the dielectric waveguide concurrently with the transmitting of block 502. According to some embodiments, the channelized RF receive signal may include a plurality of modulated RF receive signals, and each may be in a channel having a frequency band that does not overlap with the frequency band of another of the modulated RF receive signals. In embodiments, the receive signal may include first and second echoes of the transmit signal, wherein the first echo may include a concurrent echo of the transmit signal concurrent with receiving the receive signal and the second echo may include a reflected echo reflected from the paired transceiver.

A block 506 may include suppressing a concurrent echo from the receive signal, and a block 508 may include suppressing a reflected echo from the receive signal.

Figure 6:
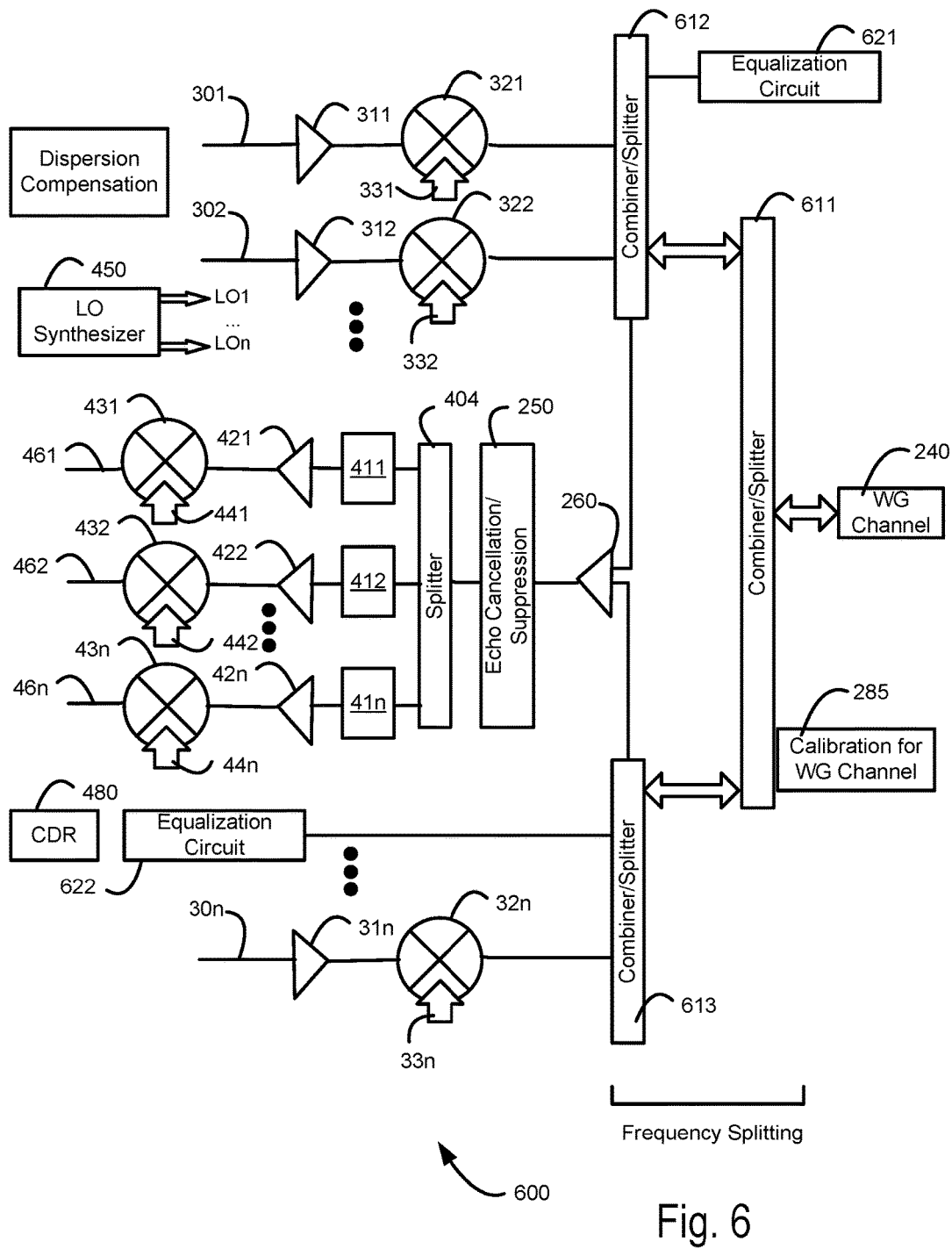
FIG. 6 depicts a block diagram of a transceiver to transmit and receive channelized signals over a dielectric waveguide with frequency splitting, in accordance with various embodiments

FIG. 6 is a block diagram of a transceiver 600 that, according to some embodiments, may include components illustrated and described in connection with FIGS. 2, 3, and 4, wherein like components have corresponding reference numerals. Transceiver 600 may further provide frequency splitting so that transmit and receive signals of first and second frequency ranges may be provided to and processed by combiner/splitters 612 and 613, respectively. In embodiments, each of combiner/splitters 612 and 613 may provide combining and splitting operations that may correspond to combining that may be provided by combiner 350 (FIG. 3) and splitting that may be provided by splitter 404 (FIG. 4). Combiner/splitter 611 may provide frequency-based splitting and combining with respect to and between combiner/splitters 612 and 613. In embodiments, frequency splitting and combining of the receive and transmit signals of the first and second frequency ranges may allow respective equalization circuits 621 and 622 to be applied to the signals of the respective first and second frequency ranges, which may provide improved equalization of the signals.

Figure 7:
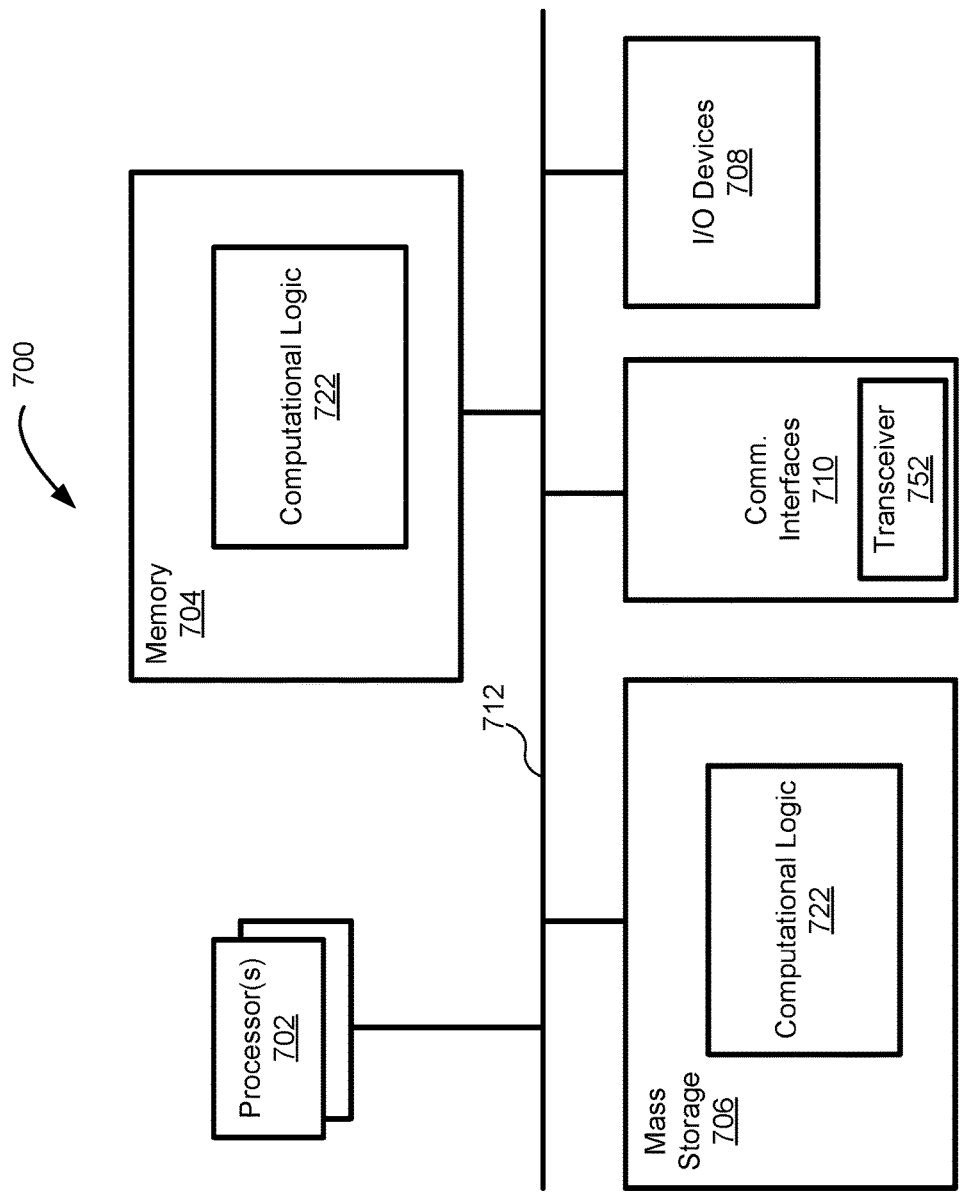
FIG. 7 is a block diagram of an example computing device, in accordance with various embodiments.

FIG. 7 illustrates a block diagram of an example computing device 700 suitable for use with various components of FIGS. 1-4 and 6, and the technique 500 of FIG. 5, in accordance with various embodiments. For example, the computing device 700 may be, or may include or otherwise be coupled to, first electronic device 102, second electronic device 104, first transceiver 106, second transceiver 108, first transmitter 116, second transmitter 120, first receiver 118, second receiver 122, first processor 112, second processor 114, transmitter 300, and/or receiver 400. As shown, computing device 700 may include one or more processors or processor cores 702 and system memory 704. For the purpose of this application, including the claims, the terms "processor" and "processor cores" may be considered synonymous, unless the context clearly requires otherwise. The processor 702 may include any type of processors, such as a central processing unit (CPU), a microprocessor, and the like. The processor 702 may be implemented as an integrated circuit having multi-cores, e.g., a multi-core microprocessor. The computing device 700 may include mass storage devices 706 (such as diskette, hard drive, volatile memory (e.g., dynamic random-access memory (DRAM), compact disc read-only memory (CD-ROM), digital versatile disk (DVD), and so forth). In general, system memory 704 and/or mass storage devices 706 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 700 may further include I/O devices 708 (such as a display (e.g., a touchscreen display), keyboard, cursor control, remote control, gaming controller, image capture device, and so forth) and communication interfaces 710 (such as network interface cards, modems, infrared receivers, radio receivers (e.g., Bluetooth), and so forth).

The communication interfaces 710 may include communication chips (not shown) that may be configured to operate the device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments. In some embodiments, the communication interfaces 710 may be, may include, and/or may be coupled with inputs 301/302/30n and/or outputs 401/402/40n. In various embodiments, the communication interfaces 710 may include a transceiver 752. In some embodiments, the transceiver 752 may be configured similarly to the first transceiver 106 and/or the second transceiver 108 described with respect to FIG. 1. In some embodiments, the transceiver 752 may be coupled with other components of the computer device 700 and/or may not be included within the communication interfaces 710.

The above-described computing device 700 elements may be coupled to each other via system bus 712, which may represent one or more buses. In the case of multiple buses, they may be bridged by one or more bus bridges (not shown). Each of these elements may perform its conventional functions known in the art. In particular, system memory 704 and mass storage devices 706 may be employed to store a working copy and a permanent copy of the programming instructions for the operation of various components of computing device 700, including but not limited to an operating system of computing device 700 and/or one or more applications. The various elements may be implemented by assembler instructions supported by processor(s) 702 or high-level languages that may be compiled into such instructions.

The permanent copy of the programming instructions may be placed into mass storage devices 706 in the factory, or in the field through, for example, a distribution medium (not shown), such as a compact disc (CD), or through communication interface 710 (from a distribution server (not shown)). That is, one or more distribution media having an implementation of the agent program may be employed to distribute the agent and to program various computing devices.

The number, capability, and/or capacity of the elements 708, 710, 712 may vary, depending on whether computing device 700 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 704 may include computational logic 722 configured to implement various firmware and/or software services associated with operations of the computing device 700. For some embodiments, at least one of processors 702 may be packaged together with computational logic 722 configured to practice aspects of embodiments described herein to form a System in Package (SiP) or a System on Chip (SoC).

In various implementations, the computing device 700 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 700 may be any other electronic device that processes data.

Figure 8:
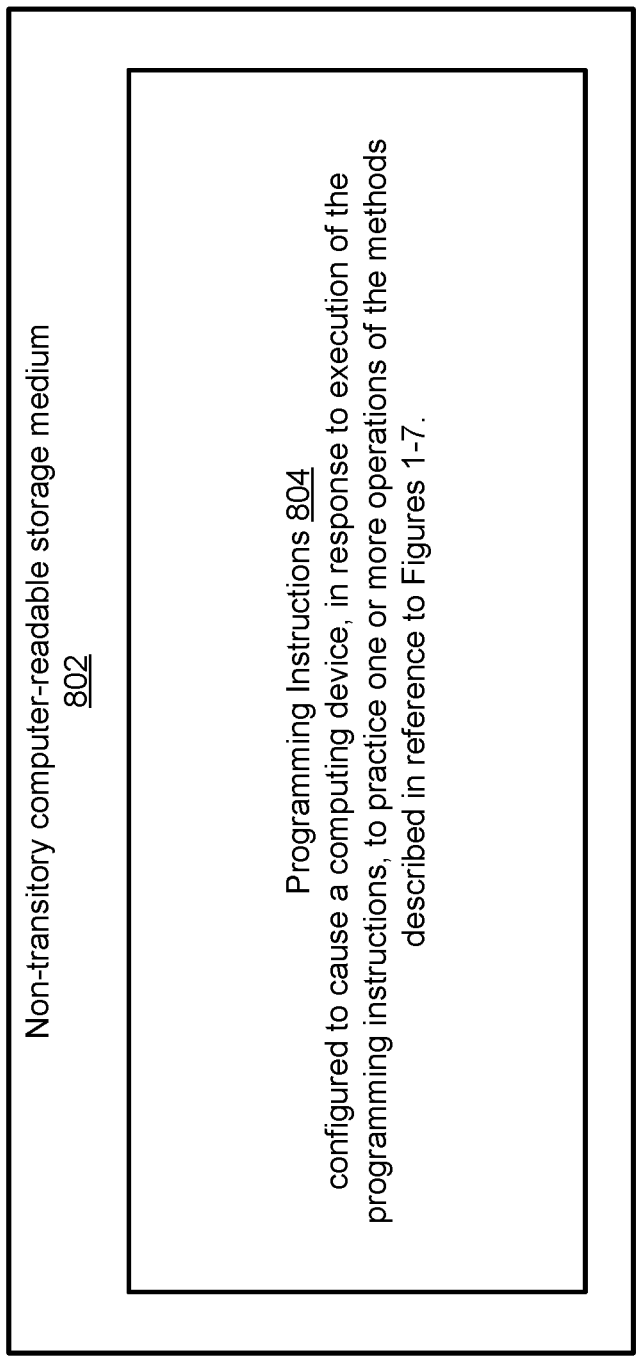
FIG. 8 illustrates an example storage medium with instructions configured to enable an apparatus to practice various aspects of the present disclosure, in accordance with various embodiments.

FIG. 8 illustrates example computer-readable storage medium 802 having instructions configured to practice all or selected ones of the operations associated with the computer device 700, earlier described with respect to FIG. 7; the first electronic device 102, the second electronic device 104, including the first transceiver 106, the second transceiver 108, the first processor 112, and/or the second processor 114 described with respect to FIG. 1; the transmitter 300, including the logic circuitry 360 described with respect to FIG. 3; the receiver 400, including the logic circuitry 470 described with respect to FIG. 4; and/or the technique of FIG. 5, in accordance with various embodiments. As illustrated, computer-readable storage medium 802 may include a number of programming instructions 804. The storage medium 802 may represent a broad range of non-transitory persistent storage medium known in the art, including but not limited to flash memory, dynamic random access memory, static random access memory, an optical disk, a magnetic disk, etc.

Programming instructions 804 may be configured to enable a device, e.g., computer device 700, first electronic device 102, and/or second electronic device 104 in response to execution of the programming instructions 804, to perform, e.g., but not limited to, various operations described for the logic circuitry 360, the logic circuitry 470, the computer device 700 of FIG. 7, or operations shown and/or described with respect to technique 500 of FIG. 5. In alternate embodiments, programming instructions 804 may be disposed on multiple computer-readable storage media 802. In alternate embodiment, storage medium 802 may be transitory, e.g., signals encoded with programming instructions 804.

Referring back to FIG. 7, for an embodiment, at least one of processors 702 may be packaged together with memory having all or portions of computational logic 722 configured to practice aspects shown or described for the system 100 shown in FIG. 1, transmitter 300 of FIG. 3, receiver 400 of FIG. 4, or operations shown or described with respect to technique 500 of FIG. 5. For an embodiment, at least one of processors 702 may be packaged together with memory having all or portions of computational logic 722 configured to practice aspects described for the system 100 shown in FIG. 1, transmitter 300 of FIG. 3, receiver 400 of FIG. 4, or operations shown or described with respect to technique 500 of FIG. 5 to form a System in Package (SiP). For an embodiment, at least one of processors 702 may be integrated on the same die with memory having all or portions of computational logic 722 configured to practice aspects described for the system 100 shown in FIG. 1, transmitter 300 of FIG. 3, receiver 400 of FIG. 4, or operations shown or described with respect to technique 500 of FIG. 5. For an embodiment, at least one of processors 702 may be packaged together with memory having all or portions of computational logic 722 configured to practice aspects of the system 100 shown in FIG. 1, transmitter 300 of FIG. 3, receiver 400 of FIG. 4, or operations shown or described with respect to technique 500 of FIG. 5 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include a full-duplex transceiver, which may comprise: a transmitter to transmit to a paired transceiver a channelized radio frequency (RF) transmit signal via a dielectric waveguide, the channelized RF transmit signal to include a plurality of modulated RF transmit signals, each in a channel that has a frequency band that does not overlap with the frequency band of another of the modulated RF transmit signals; a receiver to receive from the paired transceiver a channelized RF receive signal via the dielectric waveguide, the channelized RF receive signal including a plurality of modulated RF receive signals, each in a channel having a frequency band that does not overlap with the frequency band of another of the modulated RF receive signals; and circulator coupled between the transmitter, the receiver, and the dielectric waveguide to deliver the channelized RF transmit signal from the transmitter to the dielectric waveguide and to concurrently deliver the channelized RF receive signal from the dielectric waveguide to the receiver, and wherein the channelized RF receive signal delivered from the circulator to the receiver of each transceiver includes an echo of the channelized RF transmit signal from the transceiver, and wherein the transceiver further includes an echo suppression circuit to suppress from the channelized RF receive signal the echo of the channelized RF transmit signal of the transceiver, wherein the channelized RF transmit signal and the channelized RF receive signal each has a frequency range from a lower frequency greater than or equal to approximately 30 gigahertz (GHz) to an upper frequency less than approximately 1 terahertz (THz).

Example 2 may include the transceiver of example 1, and/or any other example herein, wherein the echo suppression circuit may be to receive the channelized RF transmit signal from the transmitter to generate an echo suppression signal and the echo suppression circuit may be to suppress the echo of the channelized RF transmit signal from the channelized RF receive signal based on the echo suppression signal.

Example 3 may include the transceiver of example 2, and/or any other example herein, wherein the echo suppression signal may correspond to the channelized RF transmit signal the circulator is to deliver to the dielectric waveguide concurrently when the circulator is to deliver the channelized RF receive signal from the dielectric waveguide to the receiver.

Example 4 may include the transceiver of example 2, and/or any other example herein, wherein the echo of the channelized RF transmit signal may be received from the dielectric waveguide and includes a delay corresponding to propagation of the channelized RF transmit signal along the dielectric waveguide and a chromatic dispersion imparted by the dielectric waveguide and wherein the transceiver further includes a calibration circuit to accommodate for the chromatic dispersion and to cooperate with the echo suppression circuit to suppress the echo received from the dielectric waveguide based on the echo suppression signal with accommodation for the chromatic dispersion.

Example 5 may include the transceiver of example 2, and/or any other example herein, wherein: the circulator may be to deliver the channelized RF receive signal from the dielectric waveguide to the receiver and the channelized RF transmit signal from the transmitter to the dielectric waveguide concurrently; the echo suppression signal may include a first echo suppression signal that corresponds to a first echo of the channelized RF transmit signal the circulator is to deliver to the dielectric waveguide concurrently when the circulator is to deliver the channelized RF receive signal from the dielectric waveguide to the receiver; and the echo suppression signal may include a second echo suppression signal that corresponds to a second echo of the channelized RF transmit signal received from the dielectric waveguide and corresponds to the channelized RF transmit signal from a previous time with a delay corresponding to propagation of the channelized RF transmit signal from the previous time along the dielectric waveguide.

Example 6 may include the transceiver of example 5, and/or any other example herein, wherein the second echo may include a chromatic dispersion from the dielectric waveguide and the transceiver further includes a calibration circuit to accommodate for the chromatic dispersion and to cooperate with the echo suppression circuit to suppress the second echo based on the second echo suppression signal with accommodation for the chromatic dispersion.

Example 7 may include the transceiver of example 2, and/or any other example herein, wherein the echo of the channelized RF transmit signal may be received from the dielectric waveguide and includes a chromatic dispersion imparted by the dielectric waveguide and wherein the transceiver further includes a calibration circuit to accommodate for the chromatic dispersion and to cooperate with the echo suppression circuit to suppress the echo received from the dielectric waveguide based on the echo suppression signal with accommodation for the chromatic dispersion.

Example 8 may include an apparatus, which may comprise: a transmitter to transmit a channelized radio frequency (RF) transmit signal via a dielectric waveguide, wherein the transmitter may include: a plurality of transmitter mixers, each of the plurality of transmitter mixers to generate a modulated RF transmit signal based at least in part on a data signal input and a local oscillator signal input specific to the transmitter mixer, wherein each modulated RF transmit signal is in a channel having a frequency band that does not overlap with the frequency band of another of the modulated RF transmit signals, and a combiner to combine the modulated RF transmit signals from the plurality of transmitter mixers as the channelized RF transmit signal for transmission over the dielectric waveguide;
a receiver to receive a channelized RF receive signal via the dielectric waveguide, the channelized RF receive signal including a plurality of modulated RF receive signals, wherein each of the modulated RF receive signals is in a channel having a frequency band that does not overlap with the frequency band of another of the modulated RF receive signals, the receiver including: a splitter to split the channelized RF receive signal into the plurality of modulated RF receive signals; and a plurality of receiver mixers to receive respective ones of the plurality of modulated RF receive signals from the splitter, each of the plurality of receiver mixers to generate a data signal output based at least in part on the respective RF receive signal and a local oscillator signal input specific to the receiver mixer; and
a circulator coupled between the transmitter, the receiver, and the dielectric waveguide to deliver the channelized RF transmit signal from the transmitter to the dielectric waveguide and to deliver the channelized RF receive signal from the dielectric waveguide to the receiver.

Example 9 may include the apparatus of example 8, and/or any other example herein, wherein the channelized RF receive signal delivered from the circulator to the receiver may include an echo of the channelized RF transmit signal and wherein the apparatus may further include an echo suppression circuit to suppress from the channelized RF receive signal the echo of the channelized RF transmit signal.

Example 10 may include the apparatus of example 9, and/or any other example herein, wherein the echo suppression circuit may be to receive the channelized RF transmit signal from the transmitter to generate an echo suppression signal and the echo suppression circuit may be to suppress the echo of the channelized RF transmit signal from the channelized RF receive signal based on the echo suppression signal.

Example 11 may include the apparatus of example 10, and/or any other example herein, wherein the circulator may be to deliver the channelized RF receive signal from the dielectric waveguide to the receiver and the channelized RF transmit signal from the transmitter to the dielectric waveguide concurrently, and wherein the echo suppression signal may correspond to the channelized RF transmit signal the circulator is to deliver to the dielectric waveguide concurrently when the circulator is to deliver the channelized RF receive signal from the dielectric waveguide to the receiver.

Example 12 may include the apparatus of example 10, and/or any other example herein, wherein the echo of the channelized RF transmit signal may be received from the dielectric waveguide and may include a delay corresponding to propagation of the channelized RF transmit signal along the dielectric waveguide and a chromatic dispersion imparted by the dielectric waveguide and wherein the apparatus may further include a calibration circuit to accommodate for the chromatic dispersion and to cooperate with the echo suppression circuit to suppress the echo received from the dielectric waveguide based on the echo suppression signal with accommodation for the chromatic dispersion.

Example 13 may include the apparatus of example 10, and/or any other example herein, wherein: the circulator may be to deliver the channelized RF receive signal from the dielectric waveguide to the receiver and the channelized RF transmit signal from the transmitter to the dielectric waveguide concurrently; the echo suppression signal may include a first echo suppression signal that corresponds to a first echo of the channelized RF transmit signal the circulator is to deliver to the dielectric waveguide concurrently when the circulator is to deliver the channelized RF receive signal from the dielectric waveguide to the receiver; and the echo suppression signal may include a second echo suppression signal that corresponds to a second echo of the channelized RF transmit signal received from the dielectric waveguide and corresponds to the channelized RF transmit signal from a previous time with a delay corresponding to propagation of the channelized RF transmit signal from the previous time along the dielectric waveguide.

Example 14 may include the apparatus of example 13, and/or any other example herein, wherein the second echo may include a chromatic dispersion from the dielectric waveguide and the apparatus further includes a calibration circuit to accommodate for the chromatic dispersion and to cooperate with the echo suppression circuit to suppress the second echo based on the second echo suppression signal with accommodation for the chromatic dispersion.

Example 15 may include the apparatus of example 8, and/or any other example herein, wherein the transmitter and the receiver may provide full-duplex communication over the dielectric waveguide.

Example 16 may include the apparatus of example 8, and/or any other example herein, wherein the channelized RF transmit signal and the channelized RF receive signal may each have a frequency range from a lower frequency greater than or equal to approximately 30 gigahertz (GHz) to an upper frequency less than approximately 1 terahertz (THz).

Example 17 may include a system, which may comprise: first and second transceivers, wherein each of the first and second transceivers may include: a transmitter to transmit to the other transceiver a channelized radio frequency (RF) transmit signal via a dielectric waveguide, the channelized RF transmit signal including a plurality of modulated RF transmit signals, each in a channel having a frequency band that does not overlap with the frequency band of another of the modulated RF transmit signals; and a receiver to receive from the other transceiver a channelized RF receive signal via the dielectric waveguide, the channelized RF receive signal including a plurality of modulated RF receive signals, each in a channel having a frequency band that does not overlap with the frequency band of another of the modulated RF receive signals; a circulator coupled between the transmitter, the receiver, and the dielectric waveguide to deliver the channelized RF transmit signal from the transmitter to the dielectric waveguide and to deliver the channelized RF receive signal from the dielectric waveguide to the receiver, and wherein the channelized RF receive signal delivered from the circulator to the receiver of each transceiver includes an echo of the channelized RF transmit signal from the transceiver, and wherein the apparatus further includes an echo suppression circuit to suppress from the channelized RF receive signal the echo of the channelized RF transmit signal of the transceiver.

Example 18 may include the system of example 17, and/or any other example herein, wherein the channelized RF transmit signal and the channelized RF receive signal may each have a frequency range from a lower frequency greater than or equal to approximately 30 gigahertz (GHz) to an upper frequency less than approximately 1 terahertz (THz).

Example 19 may include the system of example 18, and/or any other example herein, wherein the echo suppression circuit may be to receive the channelized RF transmit signal from the transmitter as an echo suppression signal and the echo suppression circuit is to suppress the echo of the channelized RF transmit signal from the channelized RF receive signal based on the echo suppression signal.

Example 20 may include the system of example 19, and/or any other example herein, wherein the circulator may be to deliver the channelized RF receive signal from the dielectric waveguide to the receiver and the channelized RF transmit signal from the transmitter to the dielectric waveguide concurrently, and wherein the echo suppression signal may correspond to the channelized RF transmit signal the circulator is to deliver to the dielectric waveguide concurrently when the circulator is to deliver the channelized RF receive signal from the dielectric waveguide to the receiver.

Example 21 may include the system of example 19, and/or any other example herein, wherein the echo of the channelized RF transmit signal may be received from the dielectric waveguide and may include a delay corresponding to propagation of the channelized RF transmit signal along the dielectric waveguide and a chromatic dispersion imparted by the dielectric waveguide and wherein the system further includes a calibration circuit to accommodate for the chromatic dispersion and to cooperate with the echo suppression circuit to suppress the echo received from the dielectric waveguide based on the echo suppression signal with accommodation for the chromatic dispersion.

Example 22 may include the system of example 19, and/or any other example herein, wherein: the circulator may be to deliver the channelized RF receive signal from the dielectric waveguide to the receiver and the channelized RF transmit signal from the transmitter to the dielectric waveguide concurrently; the echo suppression signal may include a first echo suppression signal that corresponds to a first echo of the channelized RF transmit signal the circulator is to deliver to the dielectric waveguide concurrently when the circulator is to deliver the channelized RF receive signal from the dielectric waveguide to the receiver; and the echo suppression signal may include a second echo suppression signal that corresponds to a second echo of the channelized RF transmit signal received from the dielectric waveguide and corresponds to the channelized RF transmit signal from a previous time with a delay corresponding to propagation of the channelized RF transmit signal from the previous time along the dielectric waveguide.

Example 23 may include the system of example 22, and/or any other example herein, wherein the second echo may include a chromatic dispersion from the dielectric waveguide and the system further may include a calibration circuit to accommodate for the chromatic dispersion and to cooperate with the echo suppression circuit to suppress the second echo based on the second echo suppression signal with accommodation for the chromatic dispersion.

Example 24 may include the system of example 17, and/or any other example herein, wherein the transmitter and the receiver provide full-duplex communication over the dielectric waveguide.

Example 25 may include an apparatus, which may comprise:

a transmitter to transmit a channelized radio frequency (RF) transmit signal via a dielectric waveguide, wherein the transmitter may include: a plurality of transmitter mixers, each of the plurality of transmitter mixers to generate a modulated RF transmit signal based at least in part on a data signal input and a local oscillator signal input specific to the transmitter mixer, wherein each modulated RF transmit signal is in a channel having a frequency band that does not overlap with the frequency band of another of the modulated RF transmit signals, and a combiner to combine the modulated RF transmit signals from the plurality of transmitter mixers as the channelized RF transmit signal for transmission over the dielectric waveguide;

a receiver to receive a channelized RF receive signal via the dielectric waveguide, the channelized RF receive signal including a plurality of modulated RF receive signals, wherein each of the modulated RF receive signals is in a channel having a frequency band that does not overlap with the frequency band of another of the modulated RF receive signals, wherein the receiver may include: a splitter to split the channelized RF receive signal into the plurality of modulated RF receive signals; and a plurality of receiver mixers to receive respective ones of the plurality of modulated RF receive signals from the splitter, each of the plurality of receiver mixers to generate a data signal output based at least in part on the respective RF receive signal and a local oscillator signal input specific to the receiver mixer; and a circulator coupled between the transmitter, the receiver, and the dielectric waveguide to deliver the channelized RF transmit signal from the transmitter to the dielectric waveguide and to deliver the channelized RF receive signal from the dielectric waveguide to the receiver.

Example 26 may include the apparatus of example 25, and/or any other example herein, wherein the channelized RF receive signal delivered from the circulator to the receiver may include an echo of the channelized RF transmit signal and wherein the apparatus further includes an echo suppression circuit to suppress from the channelized RF receive signal the echo of the channelized RF transmit signal.

Example 27 may include the apparatus of example 26, and/or any other example herein, wherein the echo suppression circuit may be to receive the channelized RF transmit signal from the transmitter to generate an echo suppression signal and the echo suppression circuit may be to suppress the echo of the channelized RF transmit signal from the channelized RF receive signal based on the echo suppression signal.

Example 28 may include the apparatus of example 27, and/or any other example herein, wherein the circulator may be to deliver the channelized RF receive signal from the dielectric waveguide to the receiver and the channelized RF transmit signal from the transmitter to the dielectric waveguide concurrently, and wherein the echo suppression signal may correspond to the channelized RF transmit signal the circulator is to deliver to the dielectric waveguide concurrently when the circulator is to deliver the channelized RF receive signal from the dielectric waveguide to the receiver.

Example 29 may include the apparatus of example 27, and/or any other example herein, wherein the echo of the channelized RF transmit signal may be received from the dielectric waveguide and includes a delay corresponding to propagation of the channelized RF transmit signal along the dielectric waveguide and a chromatic dispersion imparted by the dielectric waveguide and wherein the apparatus may further include a calibration circuit to accommodate for the chromatic dispersion and to cooperate with the echo suppression circuit to suppress the echo received from the dielectric waveguide based on the echo suppression signal with accommodation for the chromatic dispersion.

Example 30 may include the apparatus of example 27, and/or any other example herein, wherein: the circulator may be to deliver the channelized RF receive signal from the dielectric waveguide to the receiver and the channelized RF transmit signal from the transmitter to the dielectric waveguide concurrently; the echo suppression signal may include a first echo suppression signal that corresponds to a first echo of the channelized RF transmit signal the circulator is to deliver to the dielectric waveguide concurrently when the circulator is to deliver the channelized RF receive signal from the dielectric waveguide to the receiver; and the echo suppression signal may include a second echo suppression signal that corresponds to a second echo of the channelized RF transmit signal received from the dielectric waveguide and corresponds to the channelized RF transmit signal from a previous time with a delay corresponding to propagation of the channelized RF transmit signal from the previous time along the dielectric waveguide.

Example 31 may include the apparatus of example 30, and/or any other example herein, wherein the second echo may include a chromatic dispersion from the dielectric waveguide and the apparatus may further include a calibration circuit to accommodate for the chromatic dispersion and to cooperate with the echo suppression circuit to suppress the second echo based on the second echo suppression signal with accommodation for the chromatic dispersion.

Example 32 may include the apparatus of any of examples 25-31, and/or any other example herein, wherein the transmitter and the receiver may provide full-duplex communication over the dielectric waveguide.

Example 33 may include the apparatus of any of examples 25-31, and/or any other example herein, wherein the channelized RF transmit signal and the channelized RF receive signal each may have a frequency range from a lower frequency greater than or equal to approximately 30 gigahertz (GHz) to an upper frequency less than approximately 1 terahertz (THz).

Example 34 may include a system, which may comprise: first and second transceivers, wherein each of the first and second transceivers may include: a transmitter to transmit to the other transceiver a channelized radio frequency (RF) transmit signal via a dielectric waveguide, the channelized RF transmit signal including a plurality of modulated RF transmit signals, each in a channel having a frequency band that does not overlap with the frequency band of another of the modulated RF transmit signals; and a receiver to receive from the other transceiver a channelized RF receive signal via the dielectric waveguide, the channelized RF receive signal including a plurality of modulated RF receive signals, each in a channel having a frequency band that does not overlap with the frequency band of another of the modulated RF receive signals; a circulator coupled between the transmitter, the receiver, and the dielectric waveguide to deliver the channelized RF transmit signal from the transmitter to the dielectric waveguide and to deliver the channelized RF receive signal from the dielectric waveguide to the receiver, and wherein the channelized RF receive signal delivered from the circulator to the receiver of each transceiver includes an echo of the channelized RF transmit signal from the transceiver, and wherein the apparatus further includes an echo suppression circuit to suppress from the channelized RF receive signal the echo of the channelized RF transmit signal of the transceiver.

Example 35 may include the system of example 34, and/or any other example herein, wherein the echo suppression circuit may be to receive the channelized RF transmit signal from the transmitter as an echo suppression signal and the echo suppression circuit is to suppress the echo of the channelized RF transmit signal from the channelized RF receive signal based on the echo suppression signal.

Example 36 may include the system of example 35, and/or any other example herein, wherein the circulator is to deliver the channelized RF receive signal from the dielectric waveguide to the receiver and the channelized RF transmit signal from the transmitter to the dielectric waveguide concurrently, and wherein the echo suppression signal may correspond to the channelized RF transmit signal the circulator is to deliver to the dielectric waveguide concurrently when the circulator is to deliver the channelized RF receive signal from the dielectric waveguide to the receiver.

Example 37 may include the system of example 35, and/or any other example herein, wherein the echo of the channelized RF transmit signal is received from the dielectric waveguide and may include a delay corresponding to propagation of the channelized RF transmit signal along the dielectric waveguide and a chromatic dispersion imparted by the dielectric waveguide and wherein the system may further include a calibration circuit to accommodate for the chromatic dispersion and to cooperate with the echo suppression circuit to suppress the echo received from the dielectric waveguide based on the echo suppression signal with accommodation for the chromatic dispersion.

Example 38 may include the system of example 35, and/or any other example herein, wherein: the circulator may be to deliver the channelized RF receive signal from the dielectric waveguide to the receiver and the channelized RF transmit signal from the transmitter to the dielectric waveguide concurrently; the echo suppression signal may include a first echo suppression signal that may correspond to a first echo of the channelized RF transmit signal the circulator is to deliver to the dielectric waveguide concurrently when the circulator is to deliver the channelized RF receive signal from the dielectric waveguide to the receiver; and the echo suppression signal may include a second echo suppression signal that corresponds to a second echo of the channelized RF transmit signal received from the dielectric waveguide and corresponds to the channelized RF transmit signal from a previous time with a delay corresponding to propagation of the channelized RF transmit signal from the previous time along the dielectric waveguide.

Example 39 may include the system of example 38, and/or any other example herein, wherein the second echo may include a chromatic dispersion from the dielectric waveguide and the system may further include a calibration circuit to accommodate for the chromatic dispersion and to cooperate with the echo suppression circuit to suppress the second echo based on the second echo suppression signal with accommodation for the chromatic dispersion.

Example 40 may include the system of any of examples 34-39, and/or any other example herein, wherein the transmitter and the receiver may provide full-duplex communication over the dielectric waveguide.

Example 41 may include the system of any of examples 34-39, and/or any other example herein, wherein the channelized RF transmit signal and the channelized RF receive signal each has a frequency range from a lower frequency greater than or equal to approximately 30 gigahertz (GHz) to an upper frequency less than approximately 1 terahertz (THz).

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

The invention claimed is:

1. A full-duplex transceiver, comprising:
   a transmitter to transmit to a paired transceiver a channelized radio frequency (RF) transmit signal via a dielectric waveguide, the channelized RF transmit signal to include a plurality of modulated RF transmit signals, each in a channel that has a frequency band that does not overlap with the frequency band of another of the modulated RF transmit signals; and
   a receiver to receive from the paired transceiver a channelized RF receive signal via the dielectric waveguide, the channelized RF receive signal including a plurality of modulated RF receive signals, each in a channel having a frequency band that does not overlap with the frequency band of another of the modulated RF receive signals; and
   a circulator coupled between the transmitter, the receiver, and the dielectric waveguide to deliver the channelized RF transmit signal from the transmitter to the dielectric waveguide and to concurrently deliver the channelized RF receive signal from the dielectric waveguide to the receiver, and wherein the channelized RF receive signal delivered from the circulator to the receiver of each transceiver includes an echo of the channelized RF transmit signal from the transceiver, and wherein the transceiver further includes an echo suppression circuit to suppress from the channelized RF receive signal the echo of the channelized RF transmit signal of the transceiver, wherein the channelized RF transmit signal and the channelized RF receive signal each has a frequency range from a lower frequency greater than or equal to approximately 30 gigahertz (GHz) to an upper frequency less than approximately 1 terahertz (THz).

2. The transceiver of claim 1 wherein the echo suppression circuit is to receive the channelized RF transmit signal from the transmitter to generate an echo suppression signal and the echo suppression circuit is to suppress the echo of the channelized RF transmit signal from the channelized RF receive signal based on the echo suppression signal.

3. The transceiver of claim 2 wherein the echo suppression signal corresponds to the channelized RF transmit signal the circulator is to deliver to the dielectric waveguide concurrently when the circulator is to deliver the channelized RF receive signal from the dielectric waveguide to the receiver.

4. The transceiver of claim 2 wherein the echo of the channelized RF transmit signal is received from the dielectric waveguide and includes a delay corresponding to propagation of the channelized RF transmit signal along the dielectric waveguide and a chromatic dispersion imparted by the dielectric waveguide and wherein the transceiver further includes a calibration circuit to accommodate for the chromatic dispersion and to cooperate with the echo suppression circuit to suppress the echo received from the dielectric waveguide based on the echo suppression signal with accommodation for the chromatic dispersion.

5. The transceiver of claim 2 wherein:
   the circulator is to deliver the channelized RF receive signal from the dielectric waveguide to the receiver and the channelized RF transmit signal from the transmitter to the dielectric waveguide concurrently;
   the echo suppression signal includes a first echo suppression signal that corresponds to a first echo of the channelized RF transmit signal the circulator is to deliver to the dielectric waveguide concurrently when the circulator is to deliver the channelized RF receive signal from the dielectric waveguide to the receiver; and
   the echo suppression signal includes a second echo suppression signal that corresponds to a second echo of the channelized RF transmit signal received from the dielectric waveguide and corresponds to the channelized RF transmit signal from a previous time with a delay corresponding to propagation of the channelized RF transmit signal from the previous time along the dielectric waveguide.

6. The transceiver of claim 5 wherein the second echo includes a chromatic dispersion from the dielectric waveguide and the transceiver further includes a calibration circuit to accommodate for the chromatic dispersion and to cooperate with the echo suppression circuit to suppress the second echo based on the second echo suppression signal with accommodation for the chromatic dispersion.

7. The transceiver of claim 2 wherein the echo of the channelized RF transmit signal is received from the dielectric waveguide and includes a chromatic dispersion imparted by the dielectric waveguide and wherein the transceiver further includes a calibration circuit to accommodate for the chromatic dispersion and to cooperate with the echo suppression circuit to suppress the echo received from the dielectric waveguide based on the echo suppression signal with accommodation for the chromatic dispersion.

8. An apparatus, comprising:
   a transmitter to transmit a channelized radio frequency (RF) transmit signal via a dielectric waveguide, wherein the transmitter includes:

a plurality of transmitter mixers, each of the plurality of transmitter mixers to generate a modulated RF transmit signal based at least in part on a data signal input and a local oscillator signal input specific to the transmitter mixer, wherein each modulated RF transmit signal is in a channel having a frequency band that does not overlap with the frequency band of another of the modulated RF transmit signals, and a combiner to combine the modulated RF transmit signals from the plurality of transmitter mixers as the channelized RF transmit signal for transmission over the dielectric waveguide;

a receiver to receive a channelized RF receive signal via the dielectric waveguide, the channelized RF receive signal including a plurality of modulated RF receive signals, wherein each of the modulated RF receive signals is in a channel having a frequency band that does not overlap with the frequency band of another of the modulated RF receive signals, wherein the receiver includes:

a splitter to split the channelized RF receive signal into the plurality of modulated RF receive signals; and a plurality of receiver mixers to receive respective ones of the plurality of modulated RF receive signals from the splitter, each of the plurality of receiver mixers to generate a data signal output based at least in part on the respective RF receive signal and a local oscillator signal input specific to the receiver mixer; and a circulator coupled between the transmitter, the receiver, and the dielectric waveguide to deliver the channelized RF transmit signal from the transmitter to the dielectric waveguide and to deliver the channelized RF receive signal from the dielectric waveguide to the receiver.

9. The apparatus of claim 8 wherein the channelized RF receive signal delivered from the circulator to the receiver includes an echo of the channelized RF transmit signal and wherein the apparatus further includes an echo suppression circuit to suppress from the channelized RF receive signal the echo of the channelized RF transmit signal.

10. The apparatus of claim 9 wherein the echo suppression circuit is to receive the channelized RF transmit signal from the transmitter to generate an echo suppression signal and the echo suppression circuit is to suppress the echo of the channelized RF transmit signal from the channelized RF receive signal based on the echo suppression signal.

11. The apparatus of claim 10 wherein the circulator is to deliver the channelized RF receive signal from the dielectric waveguide to the receiver and the channelized RF transmit signal from the transmitter to the dielectric waveguide concurrently, and wherein the echo suppression signal corresponds to the channelized RF transmit signal the circulator is to deliver to the dielectric waveguide concurrently when the circulator is to deliver the channelized RF receive signal from the dielectric waveguide to the receiver.

12. The apparatus of claim 10 wherein the echo of the channelized RF transmit signal is received from the dielectric waveguide and includes a delay corresponding to propagation of the channelized RF transmit signal along the dielectric waveguide and a chromatic dispersion imparted by the dielectric waveguide and wherein the apparatus further includes a calibration circuit to accommodate for the chromatic dispersion and to cooperate with the echo suppression circuit to suppress the echo received from the dielectric waveguide based on the echo suppression signal with accommodation for the chromatic dispersion.

13. The apparatus of claim 10 wherein:
the circulator is to deliver the channelized RF receive signal from the dielectric waveguide to the receiver and the channelized RF transmit signal from the transmitter to the dielectric waveguide concurrently;

the echo suppression signal includes a first echo suppression signal that corresponds to a first echo of the channelized RF transmit signal the circulator is to deliver to the dielectric waveguide concurrently when the circulator is to deliver the channelized RF receive signal from the dielectric waveguide to the receiver; and the echo suppression signal includes a second echo suppression signal that corresponds to a second echo of the channelized RF transmit signal received from the dielectric waveguide and corresponds to the channelized RF transmit signal from a previous time with a delay corresponding to propagation of the channelized RF transmit signal from the previous time along the dielectric waveguide.

14. The apparatus of claim 13 wherein the second echo includes a chromatic dispersion from the dielectric waveguide and the apparatus further includes a calibration circuit to accommodate for the chromatic dispersion and to cooperate with the echo suppression circuit to suppress the second echo based on the second echo suppression signal with accommodation for the chromatic dispersion.

15. The apparatus of claim 8 wherein the transmitter and the receiver provide full-duplex communication over the dielectric waveguide.

16. The apparatus of claim 8 wherein the channelized RF transmit signal and the channelized RF receive signal each has a frequency range from a lower frequency greater than or equal to approximately 30 gigahertz (GHz) to an upper frequency less than approximately 1 terahertz (THz).

17. A system, comprising:
first and second transceivers, wherein each of the first and second transceivers includes:

a transmitter to transmit to the other transceiver a channelized radio frequency (RF) transmit signal via a dielectric waveguide, the channelized RF transmit signal including a plurality of modulated RF transmit signals, each in a channel having a frequency band that does not overlap with the frequency band of another of the modulated RF transmit signals;

a receiver to receive from the other transceiver a channelized RF receive signal via the dielectric waveguide, the channelized RF receive signal including a plurality of modulated RF receive signals, each in a channel having a frequency band that does not overlap with the frequency band of another of the modulated RF receive signals; and a circulator coupled between the transmitter, the receiver, and the dielectric waveguide to deliver the channelized RF transmit signal from the transmitter to the dielectric waveguide and to deliver the channelized RF receive signal from the dielectric waveguide to the receiver, and wherein the channelized RF receive signal delivered from the circulator to the receiver of each transceiver includes an echo of the channelized RF transmit signal from the transceiver, and wherein the apparatus further includes an echo suppression circuit to suppress from the channelized RF receive signal the echo of the channelized RF transmit signal of the transceiver.

18. The system of claim 17 wherein the channelized RF transmit signal and the channelized RF receive signal each has a frequency range from a lower frequency greater than or equal to approximately 30 gigahertz (GHz) to an upper frequency less than approximately 1 terahertz (THz).

19. The system of claim 18 wherein the echo suppression circuit is to receive the channelized RF transmit signal from the transmitter as an echo suppression signal and the echo suppression circuit is to suppress the echo of the channelized RF transmit signal from the channelized RF receive signal based on the echo suppression signal.

20. The system of claim 19 wherein the circulator is to deliver the channelized RF receive signal from the dielectric waveguide to the receiver and the channelized RF transmit signal from the transmitter to the dielectric waveguide concurrently, and wherein the echo suppression signal corresponds to the channelized RF transmit signal the circulator is to deliver to the dielectric waveguide concurrently when the circulator is to deliver the channelized RF receive signal from the dielectric waveguide to the receiver.

21. The system of claim 19 wherein the echo of the channelized RF transmit signal is received from the dielectric waveguide and includes a delay corresponding to propagation of the channelized RF transmit signal along the dielectric waveguide and a chromatic dispersion imparted by the dielectric waveguide and wherein the system further includes a calibration circuit to accommodate for the chromatic dispersion and to cooperate with the echo suppression circuit to suppress the echo received from the dielectric waveguide based on the echo suppression signal with accommodation for the chromatic dispersion.

22. The system of claim 19 wherein:
the circulator is to deliver the channelized RF receive signal from the dielectric waveguide to the receiver and the channelized RF transmit signal from the transmitter to the dielectric waveguide concurrently;
the echo suppression signal includes a first echo suppression signal that corresponds to a first echo of the channelized RF transmit signal the circulator is to deliver to the dielectric waveguide concurrently when the circulator is to deliver the channelized RF receive signal from the dielectric waveguide to the receiver; and
the echo suppression signal includes a second echo suppression signal that corresponds to a second echo of the channelized RF transmit signal received from the dielectric waveguide and corresponds to the channelized RF transmit signal from a previous time with a delay corresponding to propagation of the channelized RF transmit signal from the previous time along the dielectric waveguide.

23. The system of claim 22 wherein the second echo includes a chromatic dispersion from the dielectric waveguide and the system further includes a calibration circuit to accommodate for the chromatic dispersion and to cooperate with the echo suppression circuit to suppress the second echo based on the second echo suppression signal with accommodation for the chromatic dispersion.

24. The system of claim 17 wherein the transmitter and the receiver provide full-duplex communication over the dielectric waveguide.

* * * * *